United States Patent [19]
Mino et al.

[11] Patent Number: 5,519,302
[45] Date of Patent: May 21, 1996

[54] BATTERY CHARGER WHICH SUSPENDS CHARGING ACCORDING TO A VOLTAGE DROP AND RESTARTS CHARGING ACCORDING TO BATTERY TEMPERATURE

[75] Inventors: Takayuki Mino, Mihara; Toshiharu Kokuga, Sumoto, both of Japan

[73] Assignee: Sanyo Electric Co., Ltd., Osaka, Japan

[21] Appl. No.: 186,021

[22] Filed: Jan. 25, 1994

[30] Foreign Application Priority Data

Jan. 27, 1993 [JP] Japan .................................. 5-011346

[51] Int. Cl.$^6$ .................................................. H01M 10/46
[52] U.S. Cl. .................. 320/21; 320/35; 320/39
[58] Field of Search .................. 320/21, 30, 32, 320/35, 36, 39, 40, 48, 37, 38

[56] References Cited

U.S. PATENT DOCUMENTS 5,289,102  2/1994  Toya ........................... 320/35 X

FOREIGN PATENT DOCUMENTS 3-73219  11/1991  Japan .

*Primary Examiner*—Peter S. Wong
*Assistant Examiner*—Edward Tso
*Attorney, Agent, or Firm*—Wenderoth, Lind & Ponack

[57] ABSTRACT

By sensing battery voltage and temperature, a battery charger fully charges a battery even when a load is attached during charging. A control circuit suspends charging by detecting a change in battery voltage near a peak voltage. A charge restart section restarts charging depending on computations performed on the output from a temperature detection section. After charging is stopped, it is restarted if battery temperature is less than a set value, or if the rate of battery temperature rise is less than a set rate.

10 Claims, 4 Drawing Sheets

5,519,302

BATTERY CHARGER WHICH SUSPENDS CHARGING ACCORDING TO A VOLTAGE DROP AND RESTARTS CHARGING ACCORDING TO BATTERY TEMPERATURE

BACKGROUND OF THE INVENTION

This invention relates to a battery charger which suspends charging by detecting the change in battery voltage near the peak voltage, and more particularly to a battery charger that charges while a load is connected.

For the purposes of this application, to "suspend charging" means not only to completely stop charging with a zero charging current condition, but also includes trickle charging where charging current is reduced drastically.

Nickel-cadmium and nickel-hydrogen batteries have the property that battery voltage increases with charging and then decreases by $-\Delta V$ from the peak voltage at full charge. Battery chargers utilize this property to detect full charge and cease charging. However, when a load is connected in parallel with the battery during charging, battery voltage drops. Battery charger output current increases and output voltage decreases. The smaller the load resistance, in other words the larger the load current, the larger the drop in battery voltage. Even with large battery charger output impedance, there is a large voltage drop when the load is connected. Note that this situation does not occur for a battery charger that charges a battery after it is disconnected from the electrical equipment load. However, for electrical equipment such as the cordless portable telephone and the laptop computer, the load is connected during battery charging. This is because charging is performed with the battery mounted to the equipment. Particularly in the case of the portable telephone where incoming calls are initiated by another party, the use, cannot determine when the load will be connected. In other words, a decision not to connect the load during charging cannot be made. In addition, since incoming calls on the portable telephone ring a bell in a transient fashion, the load current varies during use. Changes in load current in turn cause changes in battery voltage.

In this manner, in a battery charger for load connection during charging, battery voltage drops when the load is connected. When battery voltage drops, a control circuit judges that the voltage has dropped $-\Delta V$ from the fully charged peak battery voltage, and ceases charging. Consequently, battery charging is stopped prior to reaching full charge.

This problem is solved by dividing the power supply into two separate systems, one to charge the battery, and one to supply power to the load. However, this power supply configuration not only complicates the circuitry, but also demands larger power supply output. This is because the required output is the output to charge the battery plus the output to drive the load. In particular, for large load currents, it is necessary to design the power supply to be sufficiently capable of supplying the maximum output for the load.

A power supply can be designed with constant voltage characteristics such that voltage does not drop even when the load is connected. This type of power supply experiences no $-\Delta V$ drop when the load is connected during charging. However, the constant voltage power supply also experiences no voltage drop when the battery reaches full charge, and consequently full charge cannot be detected. Therefore, a power supply with constant voltage characteristics cannot be used for the purpose of detecting full battery charge. To detect full battery charge with a single circuit power supply that outputs to a parallel connection of battery and load, characteristics which include a voltage drop when either the load is connected or the battery is fully charged are necessary. In other words, it is a imperative that the power supply have the characteristic that voltage drops when the load is connected. Therefore, a battery charger that senses battery voltage to determine full charge cannot distinguish between connection of the load and full battery charge, and in either case detects a $-\Delta V$ drop and ceases charging.

The present invention was developed to solve this problem. It is thus a primary object of the present invention to provide a battery charger for load connection during charging with a simple circuit structure that can fully charge a battery.

SUMMARY OF THE INVENTION

The battery charger of this invention determines full battery charge by detecting the change in battery voltage near the peak voltage during charging. The battery charger is provided with a control circuit to suspend charging by detecting the change in battery voltage near the peak voltage. In addition to the control circuit, the battery charger of the present invention is provided with a temperature detection section to sense battery temperature, and a charge restart section to perform computations on the output signal from the temperature detection section and to restart battery charging. After the control circuit detects a change in battery voltage near the peak voltage and suspends charging, the charge restart section performs computations on the temperature detection section output signal and forcibly resumes charging if the battery temperature is lower than a set value or the slope of the battery's temperature rise is less than a set value.

DETAILED DESCRIPTION OF THE INVENTION

The battery charger of the present invention can charge a battery to full charge, as described below, even when battery voltage drops temporarily due to connection of a load during charging.

① The battery charger commences charging of the battery.

② The control circuit senses battery voltage. The control circuit suspends charging by detecting the change in battery voltage near the peak voltage. This is done because voltage peaks out when the battery reaches full charge, then drops by $-\Delta V$ upon further charging. However, battery voltage also drops when a load is connected in parallel with the battery even when full charge has not been reached. Specifically, the control circuit, which stops charging when a change in battery voltage near the peak voltage is detected, suspends charging when the battery is fully charged and when a load is connected.

③ When a load is connected in parallel with the battery and charging is suspended, power is supplied to the load from the battery.

④ The charge restart section performs computations on the signal from the temperature detection section and determines whether or not to resume charging. If the battery temperature is lower than a set value or the slope of the battery's temperature rise is less than a set value, tile charge restart section restarts battery charging. This is done because the battery is determined not to be in a fully charged state. The timing of the restart by the charge restart section, in other words the time interval from suspension of charging until restart of charging is set, for example by a standby timer. The time interval for the standby timer is set to an the optimum value considering the time of use of the load which is an electrical equipment unit. A battery charger, that uses a standby timer and does not restart charging for a set interval after charging has been suspended, can be designed with a smaller output because the battery supplies power to the load during the interval before restart. However, it should go without saying that in the battery charger of the present invention, the charge restart section may also immediately restart charging after its suspension without the use of a standby timer.

⑤ Battery charging is restarted and when the battery reaches full charge, the control circuit again detects a change in battery voltage near the peak voltage and suspends charging. Since the charge restart section senses battery temperature and determines whether to restart charging or not, charging is not resumed when the battery has reached full charge and its temperature has increased. In other words, the charge restart section restarts charging to repeatedly charge the battery until it is fully charged.

Figure 1:
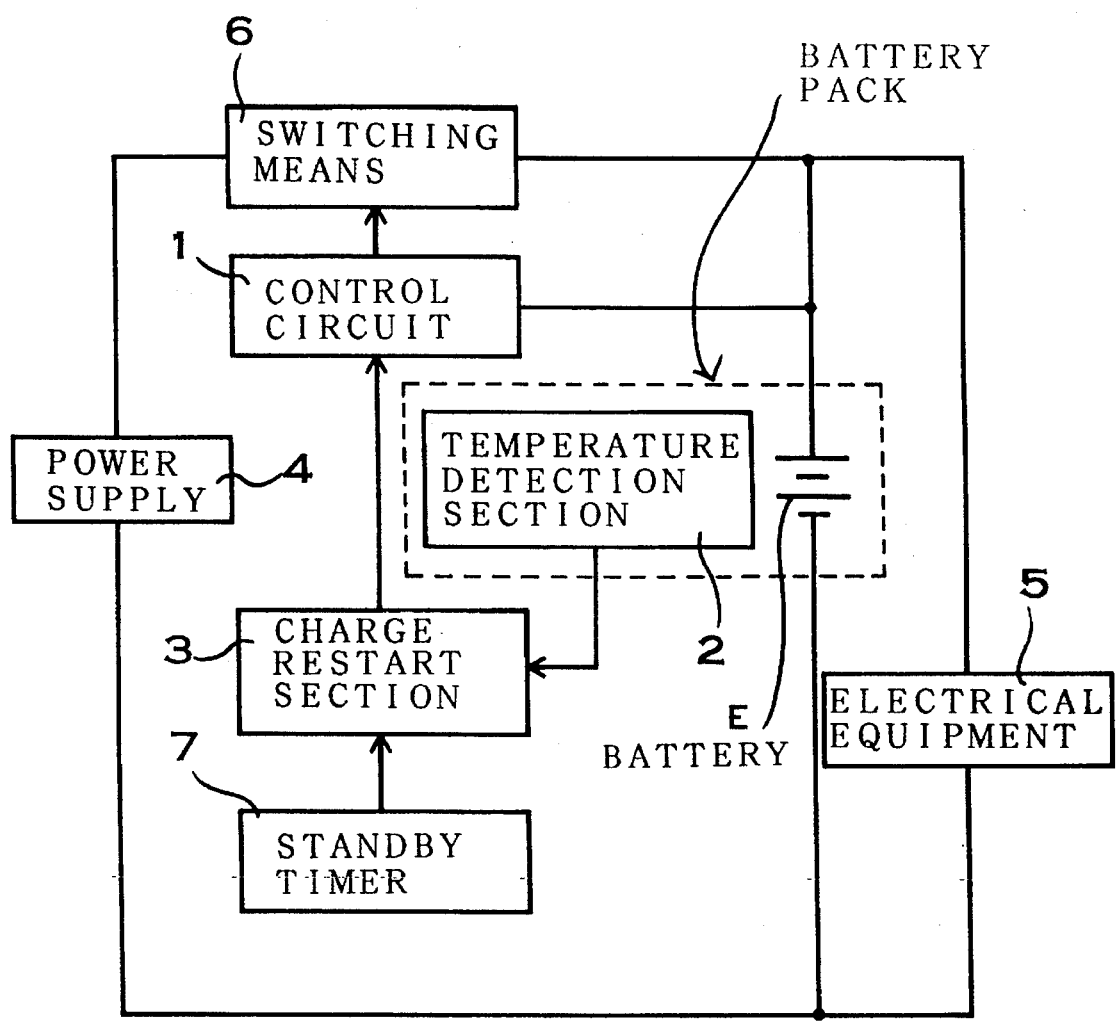
FIG. 1 is a block diagram showing a battery charger that charges a battery by a method of an embodiment of the present invention.

Turning to FIG. 1, a specific example of a battery charger for charging a battery in the manner described above is shown. The battery charger shown in this figure determines full battery charge by detecting $-\Delta V$, the voltage drop from the peak battery voltage. This battery charger is provided with a power supply 4, a control circuit 1, a temperature detection section 2, and a charge restart section 3. Electrical equipment 5 is connected in parallel with the battery E.

The power supply 4 inputs commercial power and converts it to DC output at the battery charging voltage. Specifically, the power supply has n voltage step-down section to reduce the AC voltage to the prescribed voltage, and a rectifying and smoothing circuit to convert the AC to smoothed DC. Further, in the case of constant current charging for nickel-cadmium or nickel-hydrogen batteries, a constant current circuit is provided at the output side of the power supply 4. The constant current circuit is not necessary for a battery charger that supplies a small charging current. The power supply 4 is designed with an output capacity capable of charging the battery E and temporarily supplying power to the load. If the time interval that charging is suspended can be set greater than the time of use of the electrical equipment 5, the power supply 4 output capacity can be reduced to that of charging the battery E. This is because power is supplied to the load by the battery, not by the power supply.

The control circuit 1 senses battery E voltage during charging and suspends charging. Battery voltage drops by $-\Delta V$ when the battery E reaches full charge and when the load is connected, that is when the electrical equipment connected in parallel with the battery E consumes power. When the electrical equipment is a cordless portable telephone, power is consumed when the bell rings due to an incoming call. Power is also consumed when the portable telephone is used with the battery charger mounted. When the electrical equipment is a laptop microcomputer, power is consumed when the computer power switch is turned on for use.

The control circuit 1 suspends charging when a $-\Delta V$ drop is detected without distinguishing between full battery E charge or power consumption by the electrical equipment 5. The control circuit 1 turns off the switching means 6 connected between the power supply 4 and the battery E to suspend charging. Here it is also possible for a very small current to flow and trickle charge the battery E when the control circuit 1 has turned off the switching means 6.

The temperature detection section 2 senses battery E temperature and determines whether or not to restart charging. Consequently, the temperature detection section 2 is disposed in a location next to the battery E. It is desirable for the temperature detection section 2 to be contained within the battery pack. A temperature sensor such as a thermistor can be used as the temperature detection section 2. The temperature sensor converts battery temperature to an electrical signal and inputs it to the charge restart section 3.

The charge restart section 3 performs computations on the signal from the temperature detection section 2 and computes whether or not to restart the suspended charging. When battery voltage drops by $-\Delta V$ due to load connection, battery temperature does not rise because the battery has not reached full charge. The battery has the characteristic that its temperature increases at full charge. This is because power input to the fully charged battery is not used for chemical change, but rather is converted to Joule heating. Therefore, when the control circuit 1 detects $-\Delta V$ and suspends charging, the charge restart section 3 restarts charging if the battery temperature is lower than a set value or if the slope of the battery's temperature rise is less than a set value.

In the case where the charge restart section 3 detects absolute temperature, the set value to restart charging is ambient temperature plus 10° C. However, since this set temperature value varies depending on battery capacity and charging current, it can be adjusted to an optimum value within, for example, a 5° to 15° C. range. In the case where the slope of the temperature rise is detected, the set value is 1° C./min. Charging is restarted if the slope of the temperature rise is less than this value. Since this value also varies depending on battery capacity and charging current, it is adjusted to an optimum value within, for example, a 0.5° to 2° C./min. range.

The charge restart section 3 contains a standby timer 7 that sets the time interval from suspension of charging until restart. The standby timer setting is adjusted to an optimum value considering the type of electrical equipment 5. When the electrical equipment 5 is a cordless portable telephone, the standby timer 7 is set between 10 sec. and 10 min. This is because the portable telephone bell sounds for approximately 10 sec. and a typical telephone conversation is less than 10 min By setting the standby timer interval greater than 10 sec., the power supply can be cut off from the electrical equipment 5 when the bell sounds. This means that power consumed by sounding the bell can be supplied from the battery, and not from the battery charger's power supply. Consequently, the battery charger's power supply does not need to have the power required to sound the bell. Further, if the standby timer 7 is set for 10 min, battery power will be supplied to the portable telephone during conversations. This eliminates the need for the power supply to supply power required by the portable telephone during conversations and allows a low power output design. In this manner, the power supply output of the battery charger can be reduced by providing the charge restart section 3 with a standby timer 7. However, since lengthening the interval of the standby timer 7 means that charging is not restarted during that period, it has the drawback that battery charging is slowed down.

Figure 2:
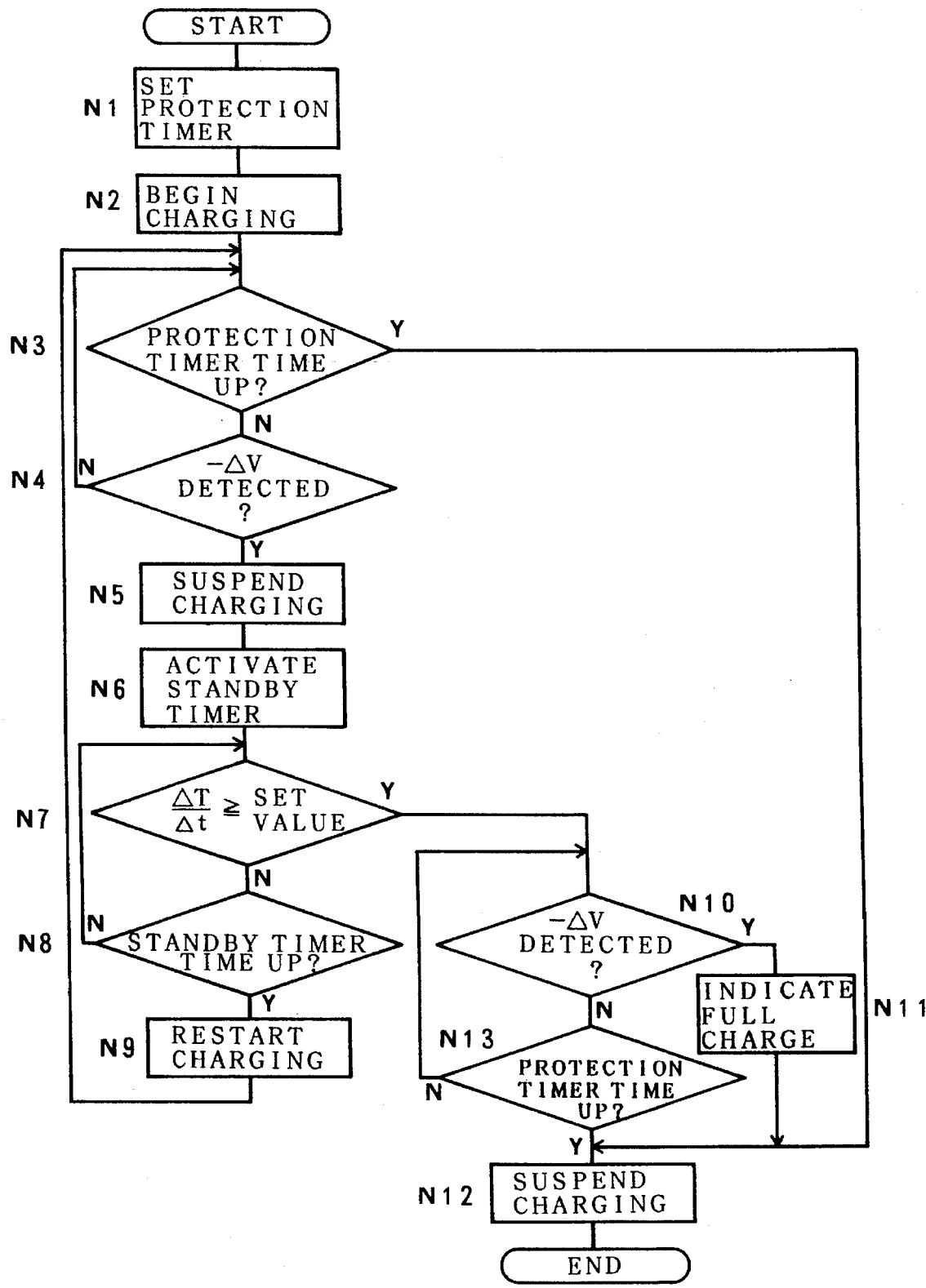
FIG. 2 is a flow-chart showing a procedure for charging a battery using the battery charger shown in FIG. 1.

The battery charger shown in FIG. 1 charges a nickel-cadmium battery or a nickel-hydrogen battery according to the flow-chart shown in FIG. 2. The following describes the process of charging a battery according to FIG. 2. [N1] Set the protection timer. The protection timer is used to forcibly shut down charging when battery charging continues indefinitely without termination. The protection timer is contained in the control circuit 1. [N2] Begin charging. [N3] Determine whether or not the protection timer has timed out. [N4] If the protection timer has not timed out, the control circuit 1 senses for a $-\Delta V$ drop. Loop to step N3 if a $-\Delta V$ drop is not detected. [N5] Suspend charging if battery voltage drops by $-\Delta V$. [N6] Activate the standby timer 7 of the charge restart section 3. [N7] Sense the slope of the battery temperature rise ($\Delta T/\Delta t$) and compare it with the set value. [N8] If the slope of the battery temperature rise ($\Delta T/\Delta t$) is not greater than the set value, determine whether or not the standby timer has timed out. Loop to step N7 if the standby timer has not timed out. [N9] If the standby timer has timed out, restart charging and loop to step N3. [N10] If the temperature rise at step N7 is greater than the set value, again sense for a $-\Delta V$ drop in battery voltage. [N11] If the battery is fully charged, a $-\Delta V$ drop is detected and full charge is indicated. [N12] Charging is suspended and the process ended. [N13] If a $-\Delta V$ drop is not detected at step N10, determine whether or not the protection timer has timed out. If the protection timer has timed out, suspend charging and end the process.

Figure 3:
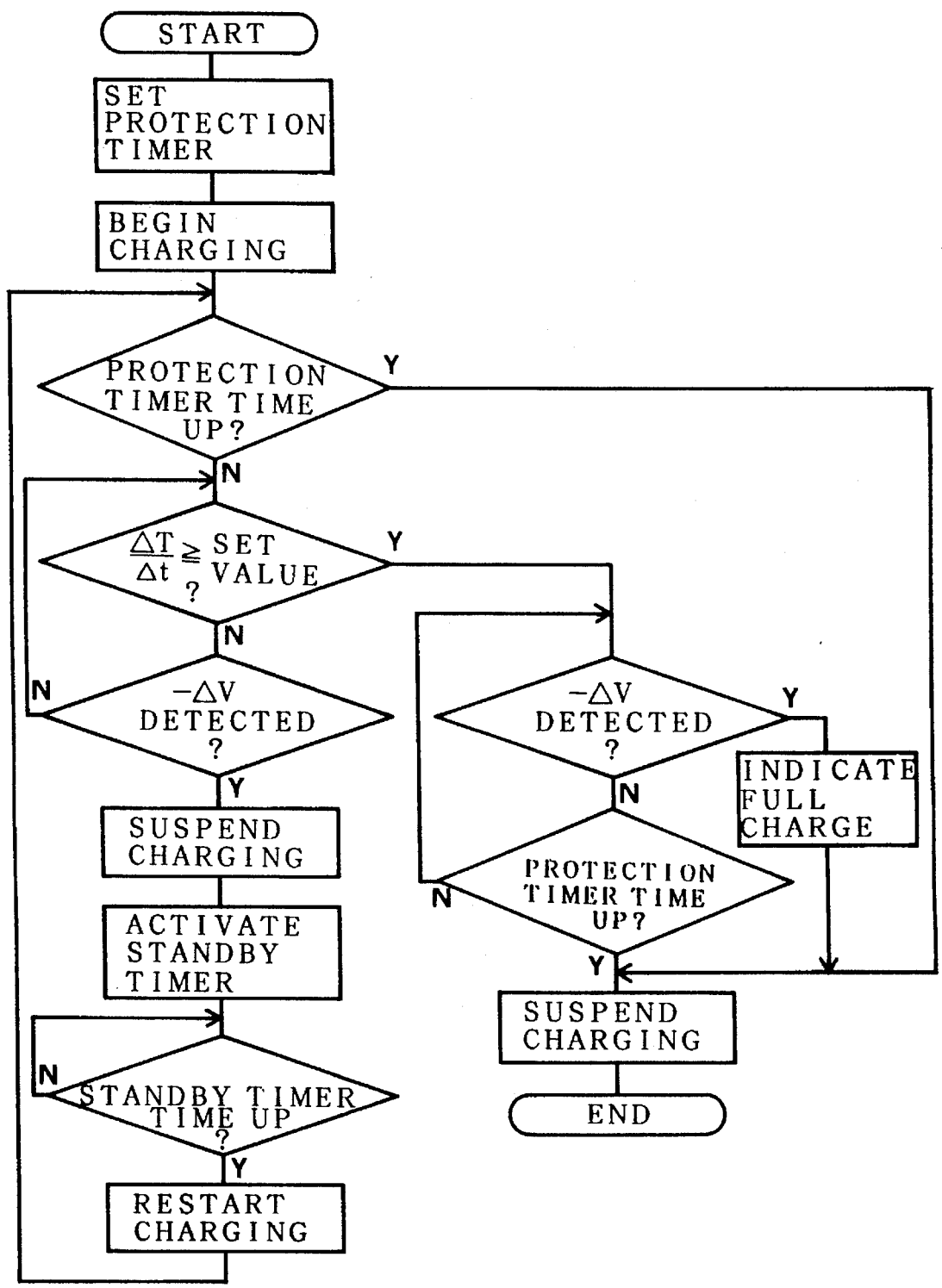
FIG. 3 is a flow-chart showing another procedure for charging a battery using the battery charger shown in FIG. 1.

As shown in FIG. 3, detection timing in the charge restart section 3 can also be altered by sensing battery temperature rise before sensing battery voltage for a $-\Delta V$ drop.

In this manner, a power supply can be designed with a substantially reduced output capacity for a battery charger with a standby timer 7 in the charge restart section 3 that refrains from restarting charging for a fixed time interval. In particular, the battery has the ability to supply sufficient power at large currents temporarily. Consequently, a battery charger, in which power is supplied by the battery when the load is connected, has the feature that its output capacity and size can be reduced.

Figure 4:
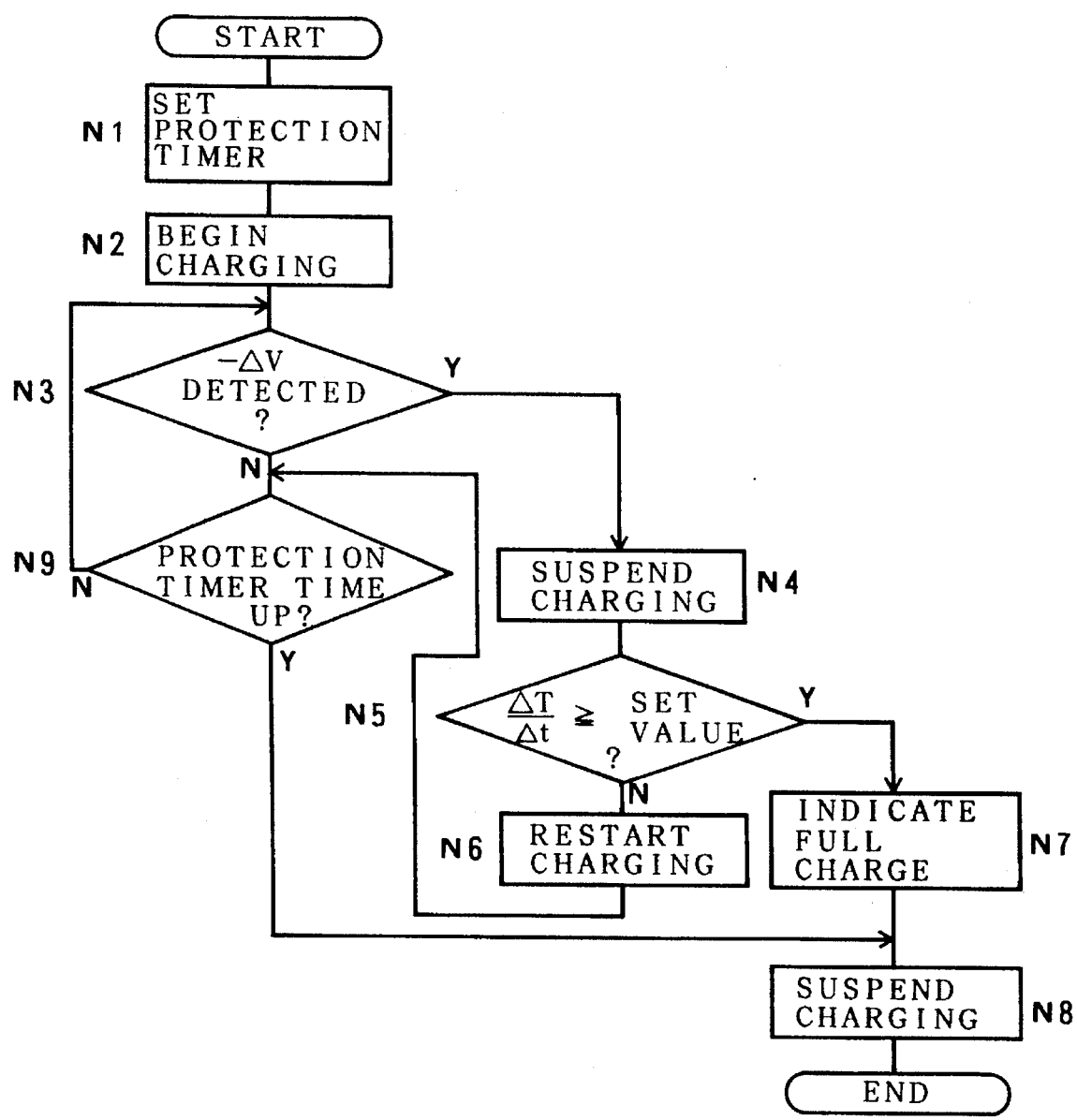
FIG. 4 is a flow-chart showing still another procedure for charging a battery using the battery charger shown in FIG. 1.

Turning to FIG. 4, the battery charger of the present invention can also charge a battery without the use of a standby timer 7. A battery is charged by the following process according to the flow-chart shown in FIG. 4. [N1] Set the protection timer. [N2] Begin charging. [N3] The control circuit 1 senses battery E for a $-\Delta V$ drop. [N4] Suspend charging if battery voltage drops by $-\Delta V$. [N5] The charge restart section 3 performs computations with the battery temperature and compares the slope of the battery temperature rise ($\Delta T/\Delta t$) with the set value. [N6] If the slope of the battery temperature rise ($\Delta T/\Delta t$) is not greater than the set value, restart charging. [N7] If the slope of the battery temperature rise ($\Delta T/\Delta t$) is greater than the set value, assume the battery is fully charged and indicate full charge. [N8] Stop charging and end the battery charging process. [N9] If no $-\Delta V$ drop in battery voltage is detected at step N3, determine if the protection timer has timed out or not. If the protection timer has timed out, stop charging and end the process. If the protection timer has not timed out, loop to step N3 and continue charging.

The battery charger shown in FIG. 1 suspends charging if the battery voltage drops by $-\Delta V$ when a load is connected. However, as long as the battery is not fully charged, the charge restart section resumes charging. The charge restart section senses battery temperature or rate of battery temperature rise with the temperature detection section and restarts charging. Consequently, even though the control circuit detects a $-\Delta V$ battery voltage drop and suspends charging, the charge restart section restarts charging until the battery is fully charged. Therefore, even though the control circuit suspends charging when the load is connected, charging is repeatedly restarted until the battery is fully charged. In this manner a battery charger, which after suspending charging due to $-\Delta V$ detection keeps restarting charging until achieving full charge, does not require the two separate power supply systems of prior art. The battery charger of the present invention has the feature that even though the battery voltage fluctuates due to load connection during charging, the circuit structure can be extremely simplified. With this single power supply system, the battery can be fully charged while also allowing power to be supplied to the load.

In the battery charger embodiment described above, charging is suspended by detecting a $-\Delta V$ voltage drop from the peak battery voltage with the control circuit. In the battery charger of the present invention, it is also possible to suspend charging by the control circuit detecting battery voltage ceasing to rise, reaching a peak value (peaking out). A battery charger that determines full charge by detecting peak battery voltage has previously been developed. The battery charger of the present invention uses the control circuit to determine full charge and suspend charging by detecting battery voltage change near the peak voltage. Namely, the peak voltage or a $-\Delta V$ voltage drop is detected and charging is suspended.

What is claimed is:

1. A battery charger for charging a battery, said battery charger operatively responsive to a load being connected to the batter during charging of the battery said battery charge comprising:

(a) a control circuit that suspends charging of the battery by a power supply upon detecting a predetermined change in battery voltage of the battery;

(b) a temperature detection section that detects a battery temperature of the batter; and (c) a charge restart section that receives an output from said temperature detection section and automatically restarts the charging suspended by said control circuit when at least one of the battery temperature is less than a first set value and a rate of increase of the battery temperature is less than a second set value.

2. A battery charger as recited in claim 1, wherein after charging is restarted said charge restart section, said control circuit again suspends charging when a predetermined drop in the battery voltage is detected.

3. A battery charger as recited in claim 1, wherein after charging is restarted by said charge restart section, said control circuit again suspends charging when a peak battery voltage of the batter is detected.

4. A battery charger as recited in claim 1, wherein the load connected to the battery during charging is a portable telephone.

5. A battery charger as recited in claim 1, wherein the load connected to the battery during charging is a microcomputer.

6. A battery charger as recited in claim 1, wherein the charge restart section restarts charging if the battery temperature is less than ambient plus 5° to 15° C.

7. A battery charger as recited in claim 1, wherein the charge restart section restarts charging if the rate of increase of the battery temperature is less than 0.5° to 2° C/min.

8. A battery charger as recited in claim 1, wherein the charge restart section includes a standby timer to set time interval from suspension of charging to charge restart.

9. A battery charger as recited in claim 8, wherein time interval set by said standby timer is between 10 sec. to 10 min.

10. A battery charger as recited in claim 1, wherein said control circuit includes a protection timer to set a total battery charging time.

* * * * *